US012322852B2

(12) United States Patent
Bianchi et al.

(10) Patent No.: US 12,322,852 B2
(45) Date of Patent: Jun. 3, 2025

(54) HIGH FREQUENCY POWER DIVIDER/COMBINER CIRCUIT INCLUDING A RAT-RACE COUPLER COUPLED BY FIRST AND SECOND COUPLING STRUCTURES TO FIRST AND SECOND INPUT/OUTPUT PORTS

(71) Applicant: Advantest Corporation, Tokyo (JP)

(72) Inventors: Giovanni Bianchi, Ehningen (DE); José Moreira, Stuttgart (DE); Alexander Quint, Rastatt (DE)

(73) Assignee: Advantest Corporation, Tokyo (JP)

( * ) Notice: Subject to any disclaimer, the term of this patent is extended or adjusted under 35 U.S.C. 154(b) by 245 days.

(21) Appl. No.: 17/735,958

(22) Filed: May 3, 2022

(65) Prior Publication Data

US 2022/0263212 A1 Aug. 18, 2022

Related U.S. Application Data

(63) Continuation of application No. PCT/EP2020/051536, filed on Jan. 22, 2020.

(51) Int. Cl.
*H01P 5/22* (2006.01)
*H01P 5/12* (2006.01)

(52) U.S. Cl.
CPC ................ *H01P 5/222* (2013.01); *H01P 5/12* (2013.01)

(58) Field of Classification Search
CPC .................................... H01P 5/22; H01P 5/12
(Continued)

(56) References Cited

U.S. PATENT DOCUMENTS 4,034,316 A * 7/1977 Bex ........................... H01P 5/22 333/120
4,636,755 A * 1/1987 Gibbs ....................... H01P 5/16 333/120

(Continued)

FOREIGN PATENT DOCUMENTS

EP 3386029 A1 10/2018
JP 61-281601 A 12/1986

OTHER PUBLICATIONS

Girdhari Chaudhary; Arbitrary Power Division Ration Rat-Race Coupler With Negative Group Delay Characteristics IEEE Catalog. IEEE Microwave and Wireless Components Letters, vol. 26, No. 8, Aug. 2016. 4 pp.

(Continued)

*Primary Examiner* — Benny T Lee

(57) ABSTRACT

A high frequency power divider circuit for distributing an input signal to two or more signal output ports, comprising: a rat race coupler, wherein the rat race coupler is configured to couple an input signal provided at an input port of the rat race coupler to a first output of the rat race coupler and to a second output of the rat race coupler; a first coupling structure coupled to the first output of the rat race coupler, to couple the first output of the rat race coupler with a first signal output port; and a second coupling structure coupled to the second output of the rat race coupler, to couple the second output of the rat race coupler with a second signal output port; wherein a characteristic impedance of a first transmission line portion between the input port and the first output of the rat race coupler deviates from a nominal ring impedance of the rat race coupler in a first direction, and wherein a characteristic impedance of a second transmission line portion between the input port and the second output of the rat race coupler deviates from the nominal ring imped- (Continued)

Compensated rat-race ance of the rat race coupler in a second direction, which is opposite to the first direction.

19 Claims, 13 Drawing Sheets

(58) Field of Classification Search
USPC .................................................. 333/120, 125
See application file for complete search history.

(56) References Cited

U.S. PATENT DOCUMENTS

| | | | | |
|---|---|---|---|---|
| 5,208,563 | A | 5/1993 | Russell et al. | |
| 6,621,468 | B2 * | 9/2003 | Kanamaluru ............ | H01P 5/12 343/893 |
| 2012/0139661 | A1 | 6/2012 | Itoh et al. | |

OTHER PUBLICATIONS

M.-J. Park B. Lee; Uniform Impedance Ring 0/180 (degree) couplers with arbitrary ring impedances and power division ratios. Catalog. www. ietdl.org. June Jun. 21, 2011. 10 pp.
Sorocki; et al. "Single-Layer Coupled-Lie Magic-Ts Utilizing Left-Handed Transmission Line Sections" Catalog. AGH University of Science and Technology. 4 pp. Mar. 1, 2023.
Wang; et al. "Size-Reduction and Band-Broadening Design Technique of Uniplanar Hybrid Ring Coupler Using Phase Inverter for M9H) Mic's" IEEE Transactions of Microwave Theory and Techniques, vol. 47, No. 2, Feb. 1999. 10 pp.

* cited by examiner

Wilkinson divider

Rat-race

Branch-line

Gysel divider

| | Δf/f0 (1) | Δf/f0 (2) | Δφ |
|---|---|---|---|
| Wilkinson | 68.4% | ∞ | 0 |
| Rat-race | 40% | 23% | 7° |
| Branch-line | 18.6% | 18.6% | 1° |
| Gysel | 40.8% | ∞ | 0 |

Fig. 4
(prior art)

Wilkinson

Rat-race

Branch-line

Gysel

Standard branch-line

In-phase branch-line

Rat-race

Compensated rat-race

| | | | | | | |
|---|---|---|---|---|---|---|
| $K_{GB}$ | 1 | 1.03 | 1.06 | 1.09 | 1.12 | 1.15 |
| amplitude unbalance, dB | 0 | 0.51 | 1.01 | 1.50 | 1.97 | 2.43 |
| relative BW, $\Delta f/f_0$ | 0 | 0.32 | 0.43 | 0.50 | 0.56 | 0.60 |

Fig. 9

| | Δf/f0 (14 dB return-loss) | Δf/f0 (0.5 dB unbalance) | Δφ |
|---|---|---|---|
| conventional | 40% | 23% | 7° |
| new solution | 40% | 31.4% | 0.75° |

HIGH FREQUENCY POWER DIVIDER/COMBINER CIRCUIT INCLUDING A RAT-RACE COUPLER COUPLED BY FIRST AND SECOND COUPLING STRUCTURES TO FIRST AND SECOND INPUT/OUTPUT PORTS

RELATED APPLICATION(S)

The present application is a Continuation of and claims priority to co-pending, commonly owned PCT Application Number PCT/EP2020/051536 to Advantest Corporation, filed 22 Jan. 2020, which is hereby incorporated herein by reference in its entirety.

TECHNICAL FILED

Embodiments according to the invention are related to a high frequency power divider for distributing an input signal to two or more signal outputs and a high frequency power combiner circuit for obtaining an output signal on the basis of input signals from two or more signal inputs.

BACKGROUND OF THE INVENTION

A power divider/combiner circuit is widely used to divide or combine high frequency signals and an important device for wireless communication system as one of the main components in a microwave circuit. There are some possible structures for designing a radio frequency power divider (combiner). In the following, a brief introduction will be given to possible structures for the power divider.

FIG. 1 shows possible structures for a radio frequency (RF) power divider. FIG. 1 (A) indicates a Wilkinson divider, FIG. 1 (B) indicates a Rat-race, FIG. 1 (C) indicates a Branch-line and FIG. 1 (D) indicates a Gysel divider. In FIG. 1, reference signs beginning with "P" indicate the RF power divider ports (RF ports), i.e. signal input/output ports P1, P2, P3, P4. All the elements indicated in FIG. 1 with the reference signs beginning with "R" are resistors, e.g. R1A, R1B, R1C, R1D, R2D. The resistance of all the resistors is equal to the nominal impedance of the circuits (R0, typically 50Ω), except RIA, which is 2*R0. All the elements in FIG. 1 with the reference signs beginning with "TL" are transmission lines or transmission line portions. All the elements in FIG. 1 with the reference signs beginning with "TL" are one quarter of wavelength (λ/4) at the centre of the operating centre frequency (f0), excluding TL4B, which is three quarters of wavelength long. Transmission lines TL1A, TL2A, TL1B, TL2B, TL3B, TL4B have a characteristic impedance Z0=R0*√2, transmission lines TL2C, TL4C, TL3D, TL4D have a characteristic impedance Z0=R0, transmission lines TL1C, TL3C have a characteristic impedance Z0=R0/√2, and transmission lines TL5D, TL6D have a characteristic impedance Z0=R0/√2. TL1D and TL2D are transmission line segments. The depicted structures are to be resembled as a printed circuit realization of the transmission lines (like microstrip, stripline). However, all the structures can be realized with any type of TEM or quasi-TEM transmission lines, such like coaxial cable, two-wire line, microstrip, stripline, coplanar waveguide, and so on.

FIG. 2 shows theoretical performances of the elements in with the reference signs beginning with "TL" as shown in FIG. 1. FIG. 2 (A) indicates the theoretical performance of the Wilkinson divider shown in FIG. 1 (A), FIG. 2 (B) indicates the theoretical performance of the Rat-race shown in FIG. 1 (B), FIG. 2 (C) indicates the theoretical performance of the Branch-line shown in FIG. 1 (C) and FIG. 2 (D) indicates the theoretical performance of the Gysel divider shown in FIG. 1 (D). In FIG. 2, for all the plots: the left y-axis is for the transmission coefficients in dB between the non-isolated ports. The right y-axis is for the transmission coefficients in dB between the isolated ports and for the return-loss at the different RF ports. The curve labels have the same type of line as the corresponding curves and are placed close to the respective y-axis. All the curves have been computed with ideal elements. The theoretical performances of the structures are described by using the scattering parameter Sij, where i=1, 2, 3, and i=1, 2, 3 . . . in FIG. 2.

FIG. 3 shows further theoretical performances over normalized frequency ($f/f_0$) of the elements in with the reference signs beginning with "TL" structures as shown in FIG. 1. FIG. 3 (A) shows a further theoretical performance of the Wilkinson divider. As shown in FIG. 3 (A), the Wilkinson divider is symmetrical (see FIG. 1 (A)), therefore the scattering parameter has a relationship as S21-S31, and hence, both amplitude and phase have are balanced.

FIG. 3 (B) shows a further theoretical performance of the Gysel divider. As shown in FIG. 3 (B), the Gysel divider is also symmetrical (see FIG. 1 (D)), therefore the scattering parameter S has a relationship as S21=S31: both amplitude in dB and phase are balanced.

When considering to evaluate the working bandwidth (Δf), i.e., the most meaningful parameter to evaluate how wide is the working bandwidth (Δf) of each circuit is the relative bandwidth (Δf/f0). It could be defined in many ways, by means of return-loss, amplitude or phase unbalance. FIG. 4 shows a table indicating the relative bandwidth of the four circuits depicted in FIG. 1, assuming:

1) 15 dB of return-loss (2nd column of the table shown in FIG. 4)
2) 0.5 dB amplitude unbalance (3rd column of the table shown in FIG. 4, the 4th column contains the corresponding phase unbalance Δφ of the table shown in FIG. 4).

As indicated in FIG. 4, the Wilkinson and the Gysel have no unbalance, e.g., Δφ is 0, and their relative bandwidth to that respect is infinite. FIG. 4 illustrate exemplary values for $\Delta f/f_0$ (port 1), $\Delta f/f_0$ (port 2) and Δφ for Wilkinson, Rat-race, Branch-line and Gysel divider networks.

FIG. 5 shows schematic illustrations indicating examples of physical layouts of the power dividers indicated in FIG. 1. FIG. 5 (A) shows a physical layout of the Wilkinson divider as shown in FIG. 1 (A), FIG. 5 (B) shows a physical layout of the Rat-race as shown in FIG. 1 (B), FIG. 5 (C) shows a physical layout of the Branch-line as shown in FIG. 1 (C), and FIG. 5 (D) shows a physical layout of the Gysel divider as shown in FIG. 1 (D). FIGS. 5A, 5B, and 5B illustrate rounding of a terminal by a via hole ["GND (via-hole"], e.g. to a ground layer of a PCB (not shown). In FIG. 5, the shown physical layouts, i.e., realistic layouts of microstrip designs, for example, with the centre frequency f0=30 GHz, substrate with relative dielectric constant (εr) =3.5, height (h)=0.25 mm, and metal thickness (t)=20 μm. A scale line of 5 mm is illustrated for reference.

Considering the wideband applications, the Wilkinson divider could be a main or a first candidate. The main problems associated with the Wilkinson divider are the need of a lumped, i.e. <<λ/4 long, resistor R1A (see FIG. 5 (A)). In the case shown in FIG. 5 (A), the size of R1A is close to the minimum possible for the present technology, e.g. 0.4×0.5 mm, and is already comparable with length of the transmission line portions TL1A and TL2A which are equal to λ/4, i.e. quarter of a wave length. Relatively large resistors involve degradation on isolation (indicated by the scattering parameter S32), insertion-loss (indicated by the scattering parameter S21, S31), and return-loss (indicated by the scattering parameter S11, S22, S33) compared with the ideal case. Therefore, increasing the centre frequency, the problem becomes more severe.

Moreover, the transmission lines TL1A and TL2A should be isolated: this is in contrast with the need of small R1A. In order to minimize the coupling (which degrades S11, S22, S33, S32) a curved geometry is often used (like in this case). This is however not always possible, particularly at very high frequency (i.e., having very short transmission lines TL1A, TL2A).

Contrary to the Wilkinson divider, other power divider circuits, i.e., Rat-race, Branch-line and Gysel divider shown in FIG. 5 do not need a lumped resistor. Rather these power dividers are terminated to ground by a resistor R0 that have—in principle—no conceptual limitation on their size, e.g. an infinitely long transmission-line with Z0=R0 is one possible realization of such termination. However, the relative bandwidth of those circuits is consistently smaller than the Wilkinson divider: from the largest to the smallest the Wilkinson divider, the Gysel divider, the Rat-race, the Branch-line.

The Branch-line has moreover strong discontinuity effects on the junctions of a first port P1—a transmission line TL1C—a transmission line TL4C, a second port P2—a transmission line TL2C—a transmission line TL3C, a third port P3—a transmission line TL1C—a transmission line TL2C, resistor R1C—a transmission line TL3C—a transmission line TL4C. Also, the Gysel divider has also strong discontinuity effects on the junctions of a transmission line TL4D—a resistor R2D—a transmission line TL6D, a transmission line TL3D—a resistor R1D—a transmission line TL5D. These strong discontinuity effects on the junction is achieved due to the low characteristic impedance: $Z0=R0/\sqrt{2}$ of the transmission lines TL1C, TL3C and Z0=R0/2 of the transmission lines TL5D, TL6D and consequently large width. At high frequency, the size of those T-junctions becomes comparable with the transmission-line lengths. The circuit performances become critical, not well predictable and extremely sensitive to the manufacturing tolerances.

The Rat-race present this problem less, due to the high impedance value Z0 (and thus narrow width) of transmission lines TL1B, TL2B, TL3B, and TL4B. The discontinuity can be further minimized by tapering the feeding lines, as shown in FIG. 5 (B).

FIG. 6 shows a modification example of the Branch-line. FIG. 6 (*a*1) shows a standard Branch-line type divider and FIG. 6 (*a*2) shows a modified Branch-line type divider, i.e., in-phase Branch-line. The branch-line output ports P2, P3 are 90° phase-shifted, rather than in phase. If that is needed, compensation networks are needed. One example is the Schiffman phase shifter as shown in FIG. 6 (*a*2): transmission lines TLSC, TL6C are coupled lines having the electrical length λ/4 at the centre frequency f0 and with even (odd) mode impedance Z0E (Z0O) such that $Z0E*Z0O=R0^2$, a transmission line portion TL7C is a transmission line portion having the electrical length λ/4 at the centre frequency f0 with Z0=R0. Swapping the position of the transmission lines TL5C, TL6C and the transmission line portion TL7C, 180° shift between output ports P2, P3 is obtained. In any case, the bandwidth of the branch-line remains the same.

Therefore, considering the above mentioned problem, e.g. working bandwidth, phase unbalance, well predictable circuit performance and tolerance range of the manufacturing, the Rat-race, i.e., rat race coupler seems to be a suitable to solve the above mentioned problems.

SUMMARY OF THE INVENTION

Accordingly, it is an object of the present invention to create a concept which facilitates the implementation of a high frequency power divider/combiner circuit by using a Rat-race coupler.

An embodiment according to the invention relates to a high frequency power divider circuit for distributing an input signal to two or more signal output ports. The high frequency divider circuit comprises a rat race coupler, wherein the rat race coupler is configured to couple an input signal provided at an input port of the rat race coupler to a first output of the rat race coupler and to a second output of the rat race coupler; a first coupling structure coupled to the first output of the rat race coupler, to couple the first output of the rat race coupler with a first signal output port; and a second coupling structure coupled to the second output of the rat race coupler, to couple the second output of the rat race coupler with a second signal output port; wherein a characteristic impedance of a first transmission line portion between the input port and the first output of the rat race coupler deviates from a nominal ring impedance of the rat race coupler in a first direction, e.g., the characteristic impedance of first transmission line portion between the input port and the first output of the rat race coupler is smaller than the nominal ring impedance of the rat race coupler, and wherein a characteristic impedance of a second transmission line portion between the input port and the second output of the rat race coupler deviates from the nominal ring impedance of the rat race coupler in a second direction, which is opposite to the first direction. For example, the characteristic impedance of a second transmission line portion between the input port and the second output of the rat race coupler is greater than the nominal ring impedance of the rat race coupler.

According to the concept of the present invention, the characteristic impedance of a second transmission line portion between the input port and the second output of the rat race coupler deviates from the nominal ring impedance of the rat race coupler in a second direction, which is opposite to the first direction is larger than the nominal ring impedance, such that, at the design frequency of the rat race coupler, a larger signal power of the input signal is coupled to the first output port than to the second signal output port, and such that a signal power of the input signal coupled to the first output port decreases, to become smaller than the signal power of the input signal coupled to the second output port, when the frequency of the input signal moves away from the design frequency of the rat race coupler within an environment of the design frequency.

In accordance with embodiments of the present invention, the characteristic impedance of a third transmission line portion between the second output of the rat race coupler and a further port of the rat race coupler deviates from the nominal ring impedance in the same direction as the characteristic impedance of the first transmission line portion. In addition, the characteristic impedance of a fourth transmission line portion between the first output of the rat race coupler and a further port of the rat race coupler deviates from the nominal ring impedance in the same direction as the characteristic impedance of the second transmission line portion.

In accordance with embodiments of the present invention, a value of the characteristic impedance of the first transmission line portion differs from a value of the characteristic impedance of the third transmission line portion by no more than ±25%, or by no more than ±10% of the characteristic impedance of the first transmission line portion and the characteristic impedance of the second transmission line portion.

In accordance with embodiments of the present invention, a value of the characteristic impedance of the second transmission line portion differs from a value of the characteristic impedance of the fourth transmission line portion by no more than ±25%, or by no more than ±10% of the characteristic impedance of the second transmission line portion and the characteristic impedance of the first transmission line portion.

In accordance with embodiments of the present invention, a multiplied value of the characteristic impedance of the first transmission line portion or the characteristic impedance of the third transmission line portion with the characteristic impedance of the second transmission line portion or the characteristic impedance of the fourth transmission line portion is equal to the value of square of the nominal ring impedance within a tolerance of ±10%.

In accordance with embodiments of the present invention, the value of the characteristic impedance of the first transmission line portion or the characteristic impedance of the third transmission line portion is smaller than the value of the characteristic impedance of the second transmission line portion or the characteristic impedance of the fourth transmission line portion. In addition, the deviation range of the characteristic impedance from the nominal ring impedance is within ±20% or within ±10% of the value of the nominal ring impedance.

In accordance with embodiments of the present invention, the value of the characteristic impedance of the first and the third transmission line portion deviates between +1% and +20%, or between +1% to +10% of the value of the nominal ring impedance, and the characteristic impedance of the second and the fourth transmission line portion deviates between −1% and −20%, or between −1% to −10% of the value of the nominal ring impedance, or vice versa.

An embodiment according to the invention relates to a high frequency power divider circuit for distributing an input signal to two or more signal output ports. The high frequency power divider circuit comprises: a rat race coupler, wherein the rat race coupler is configured to couple an input signal provided at an input port of the rat race coupler to a first output of the rat race coupler and to a second output of the rat race coupler; a first coupling structure coupled to the first output of the rat race coupler, to couple the first output of the rat race coupler with a first signal output port; and a second coupling structure coupled to the second output of the rat race coupler, to couple the second output of the rat race coupler with a second signal output port; wherein the first coupling structure and the second coupling structure are adapted to provide different phase shift over frequency; wherein the first coupling structure comprises a phase shifter adapted to at least partially compensate for a frequency variation of a phase difference between signals at the first output of the rat race coupler and at the second output of the rat race coupler in an environment of a design frequency of the rat race coupler.

In accordance with embodiments of the present invention, the second coupling structure comprises a pair of coupled transmission lines, wherein a first end of a first coupled transmission line is connected with the second output of the rat race coupler, wherein a second end of the first coupled transmission line is connected to a second end of a second coupled transmission line, which is adjacent to the second end of the first coupled transmission line, and wherein the first end of the second coupled transmission line is connected to second signal output port, or constitutes the second signal output port.

In accordance with embodiments of the present invention, the first end of the first coupled transmission line is connected with the second output of the rat race coupler via a further transmission line. In addition, a characteristic impedance of further transmission line deviates from a reference impedance by no more than ±5% or by no more than ±10%. Furthermore, a product of an even mode impedance of the pair of coupled transmission lines and of an odd mode impedance of the pair of coupled transmission lines deviates from a square of the reference impedance by no more than ±5% or by no more than ±10% or by no more than ±15%.

In accordance with embodiments of the present invention, an electrical length of the coupled transmission lines of the pair of coupled transmission lines deviates from a fourth of a wavelength at a design centre frequency of the rat race coupler by no more than ±5%, or by no more than ±10%, e.g. in other words, the coupled transmission lines are lambda/4 transmission lines at a design centre frequency of the rat race coupler within a tolerance of ±5% or ±10%.

In accordance with embodiments of the present invention, a length of the further transmission line is chosen to decouple stray fields of the pair of coupled transmission lines from the rat race coupler. In addition, an electrical length of a transmission line forming the first coupling structure is equal to an electrical length of the further transmission line plus half a wavelength, with a tolerance of ± a tenth of a wavelength.

An embodiment according to the invention relates to a high frequency power combiner circuit for obtaining an output signal on the basis of input signals from two or more signal input ports. The high frequency power combiner circuit comprises: a rat race coupler, wherein the rat race coupler is configured to provide an output signal at an output port of the rat race coupler on the basis of a signal at a first input of the rat race coupler and on the basis of a signal at a second input of the rat race coupler; a first coupling structure coupled to the first input of the rat race coupler, to couple the first input of the rat race coupler with a first signal input port; and a second coupling structure coupled to the second input of the rat race coupler, to couple the second input of the rat race coupler with a second signal input port; wherein a characteristic impedance of a first transmission line portion between the output port and the first input of the rat race coupler deviates from a nominal ring impedance of the rat race coupler in a first direction, and wherein a characteristic impedance of a second transmission line portion between the output port and the second input of the rat race coupler deviates from the nominal ring impedance of the rat race coupler in a second direction, which is opposite to the first direction.

An embodiment according to the invention relates to a high frequency power combiner circuit for obtaining an output signal on the basis of input signals from two or more signal input ports. The high frequency power combiner circuit comprises: a rat race coupler, wherein the rat race coupler is configured to provide an output signal at an output port of the rat race coupler on the basis of a signal at a first input of the rat race coupler and on the basis of a signal at a second input of the rat race coupler; a first coupling structure coupled to the first input of the rat race coupler, to couple the first input of the rat race coupler with a first signal input port; and a second coupling structure coupled to the second input of the rat race coupler, to couple the second input of the rat race coupler with a second signal input port; wherein the first coupling structure and the second coupling structure are adapted to provide different phase shift over frequency; wherein the first coupling structure comprises a phase shifter adapted to at least partially compensate for a difference of frequency variations of transmission characteristics from the first input of the rat race coupler to the output port, and from the second input of the rat race coupler to the output port, which affect a combination of signals at the first input of the rat race coupler and at the second input of the rat race coupler, in an environment of a design frequency of the rat race coupler.

In accordance with embodiments of the present invention, a high frequency power divider circuit for distributing an input signal to two or more signal output ports includes a rat race coupler configured to couple an input signal provided at an input port thereof to a first output and to a second output thereof, a first coupling structure coupled to the first output of the rat race coupler and configured to couple the first output of the rat race coupler with a first signal output port, and a second coupling structure coupled to the second output of the rat race coupler and configured to couple the second output of the rat race coupler with a second signal output port, wherein a characteristic impedance of a first transmission line portion between the input port and the first output of the rat race coupler deviates from a nominal ring impedance of the rat race coupler in a first direction. A characteristic impedance of a second transmission line portion between the input port and the second output of the rat race coupler deviates from the nominal ring impedance of the rat race coupler in a second direction, which is opposite to the first direction.

Embodiments in accordance with the present invention include the above and further include wherein a characteristic impedance of a third transmission line portion between the second output of the rat race coupler and another port of the rat race coupler deviates from the nominal ring impedance in the same direction as the characteristic impedance of the first transmission line portion.

Embodiments in accordance with the present invention include the above and further include, wherein a characteristic impedance of a fourth transmission line portion between the first output of the rat race coupler and yet another port of the rat race coupler deviates from the nominal ring impedance in the same direction as the characteristic impedance of the second transmission line portion.

Embodiments in accordance with the present invention include the above and further include wherein the characteristic impedance of the first transmission line portion differs from the characteristic impedance of the third transmission line portion by no more than ±25% of the characteristic impedance of the first transmission line portion and the characteristic impedance of the second transmission line portion.

Embodiments in accordance with the present invention include the above and further include wherein the characteristic impedance of the second transmission line portion differs from the characteristic impedance of the fourth transmission line portion by no more than ±25% of the characteristic impedance of the second transmission line portion and the characteristic impedance of the first transmission line portion.

Embodiments in accordance with the present invention include the above and further include wherein a multiplied value of the characteristic impedance of the first transmission line portion with the characteristic impedance of the second transmission line portion is equal to the square of the nominal ring impedance within a tolerance of ±10%.

Embodiments in accordance with the present invention include the above and further include wherein the characteristic impedance of the first transmission line portion is smaller than the characteristic impedance of the second transmission line portion.

Embodiments in accordance with the present invention include the above and further include wherein the deviation range of the characteristic impedance from the nominal ring impedance is within ±20% of the nominal ring impedance.

Embodiments in accordance with the present invention include the above and further include wherein the characteristic impedance of the first and the third transmission line portions deviate between +1% and +20% of the nominal ring impedance, and the characteristic impedance of the second and the fourth transmission line portions deviate between −1% and −20% of the nominal ring impedance.

In accordance with embodiments of the present invention, a high frequency power divider circuit for distributing an input signal to two or more signal output ports includes a rat race coupler configured to couple an input signal provided at an input port thereof to a first output to a second output thereof, a first coupling structure coupled to the first output for coupling the first output with a first signal output port, and a second coupling structure coupled to the second output for coupling the second output with a second signal output port, wherein the first coupling structure and the second coupling structure are adapted to provide different phase shift over frequency. The first coupling structure includes a phase shifter adapted to at least partially compensate for a frequency variation of a phase difference between signals at the first output of the rat race coupler and at the second output of the rat race coupler in a system configured to operate at a design frequency of the rat race coupler.

Embodiments in accordance with the present invention include the above and further include wherein the second coupling structure includes a pair of coupled transmission lines, wherein a first end of a first coupled transmission line is coupled with the second output of the rat race coupler, wherein a second end of the first coupled transmission line is coupled to a second end of a second coupled transmission line, which is adjacent to the second end of the first coupled transmission line. The first end of the second coupled transmission line is coupled to the second signal output port.

Embodiments in accordance with the present invention include the above and further include wherein the first end of the first coupled transmission line is coupled with the second output of the rat race coupler via a further transmission line.

Embodiments in accordance with the present invention include the above and further include wherein a characteristic impedance of further transmission line deviates from a reference impedance by no more than ±5%.

Embodiments in accordance with the present invention include the above and further include wherein a product of an even mode impedance of the pair of coupled transmission lines and of an odd mode impedance of the pair of coupled transmission lines deviates from a square of the reference impedance by no more than ±5%.

Embodiments in accordance with the present invention include the above and further include wherein an electrical length of the coupled transmission lines of the pair of coupled transmission lines deviates from a fourth of a wavelength at a design centre frequency of the rat race coupler by no more than ±5%.

Embodiments in accordance with the present invention include the above and further include wherein a length of the further transmission line is selected to decouple stray fields of the pair of coupled transmission lines from the rat race coupler.

Embodiments in accordance with the present invention include the above and further include wherein an electrical length of a transmission line forming the first coupling structure is equal to an electrical length of the further transmission line plus half a wavelength, with a tolerance of ± a tenth of a wavelength.

In accordance with embodiments of the present invention, a high frequency power combiner circuit for obtaining an output signal on the basis of input signals from two or more signal input ports includes a rat race coupler configured to provide an output signal at an output port thereof on the basis of a signal at a first input thereof and on the basis of a signal at a second input thereof, a first coupling structure coupled to the first input thereof, to couple the first input thereof with a first signal input port, and a second coupling structure coupled to the second input thereof, to couple the second input thereof with a second signal input port, wherein a characteristic impedance of a first transmission line portion between the output port and the first input thereof deviates from a nominal ring impedance thereof in a first direction. A characteristic impedance of a second transmission line portion between the output port and the second input thereof deviates from the nominal ring impedance thereof in a second direction, which is opposite to the first direction.

In accordance with embodiments of the present invention, a high frequency power combiner circuit for obtaining an output signal on the basis of input signals from two or more signal input ports includes a rat race coupler, wherein the rat race coupler is configured to provide an output signal at an output port of the rat race coupler on the basis of signals at a first input at a signal at a second input thereof, a first coupling structure coupled to the first input of the rat race coupler, for coupling the first input of the rat race coupler with a first signal input port, and a second coupling structure coupled to the second input of the rat race coupler, for coupling the second input of the rat race coupler with a second signal input port, wherein the first coupling structure and the second coupling structure are adapted to provide different phase shift over frequency. The first coupling structure includes a phase shifter adapted to at least partially compensate for a difference of frequency variations of transmission characteristics from the first input of the rat race coupler to the output port, and from the second input of the rat race coupler to the output port in a system configured to operated at a design frequency of the rat race coupler.

Embodiments in accordance with the present invention include the above and further include wherein the second coupling structure includes a pair of coupled transmission lines, wherein a first end of a first coupled transmission line is coupled with the second output of the rat race coupler, wherein a second end of the first coupled transmission line is coupled to a second end of a second coupled transmission line, which is adjacent to the second end of the first coupled transmission line. A characteristic impedance of the first and second transmission lines varies by no more that ±25%.

BRIEF DESCRIPTION OF THE FIGURES

Embodiments according to the invention will subsequently be described taking reference to the enclosed figures.

FIG. 4 shows a table indicating the relative bandwidth of the four circuits according to the structures as shown in FIGS. 1A-1D.

FIGS. 6A1 and 6A2 show modification examples of the Branch-line according to the prior art shown in FIG. 1C.

FIG. 9 shows a table to indicate an amplitude unbalance and a relative bandwidth in dependence on the value of $K_{GB}$ according to embodiments of the present application.

DETAILED DESCRIPTION OF THE EMBODIMENTS

Throughout the Present Application, the same reference symbology refers to the same element or type of element in the description and Figures.

Figure 1A:
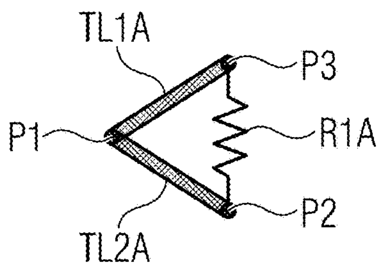
Fig. 1(A) (prior art)
FIGS. 1A, 1B, 1C, and 1D show schematic illustrations of possible structures for a radio frequency (RF) power divider according to the prior art.
Figure 1B:
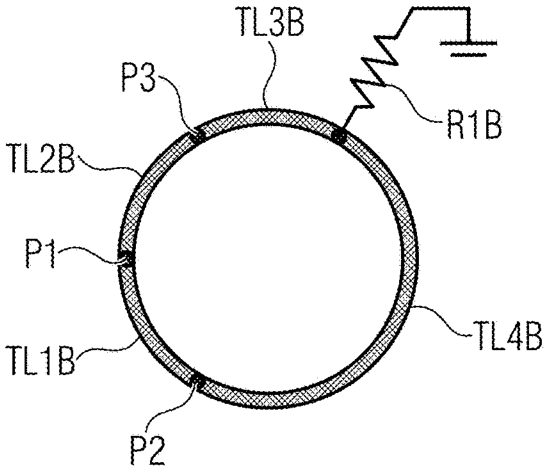
Fig. 1(B) (prior art)
Figure 1C:
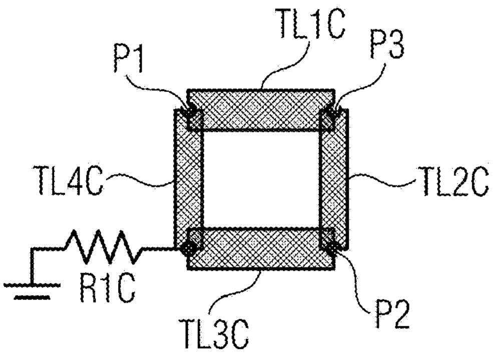
Fig. 1(C) (prior art)
Figure 1D:
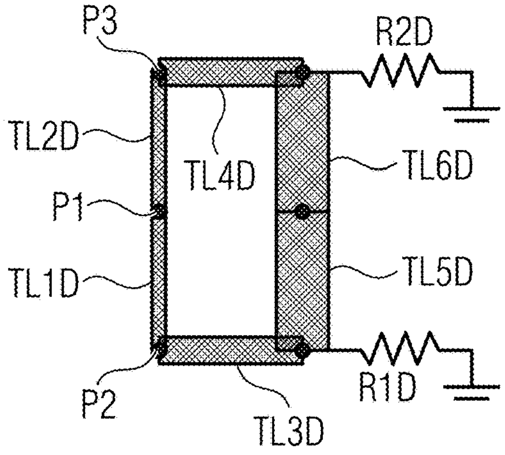
Fig. 1(D) (prior art)
Figure 2A:
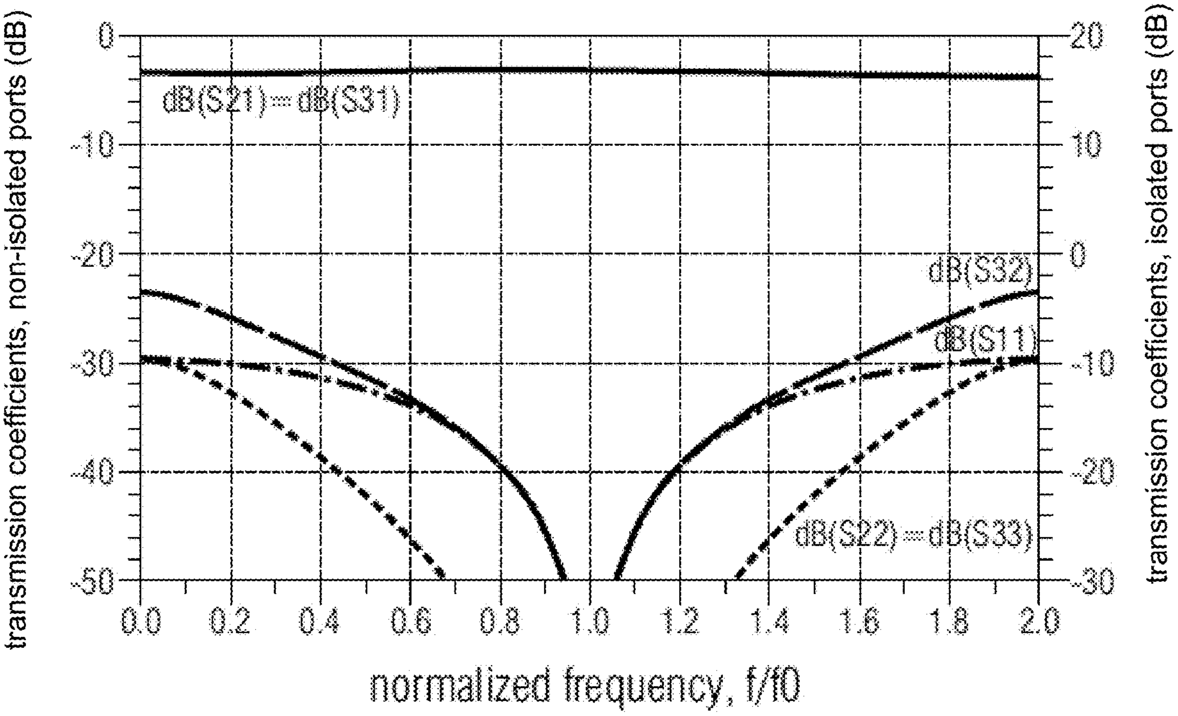
FIGS. 2A, 2B, 2C, and 2D show schematic illustrations representing theoretical performances of the structures as shown in FIGS. 1A-1D.
Figure 2B:
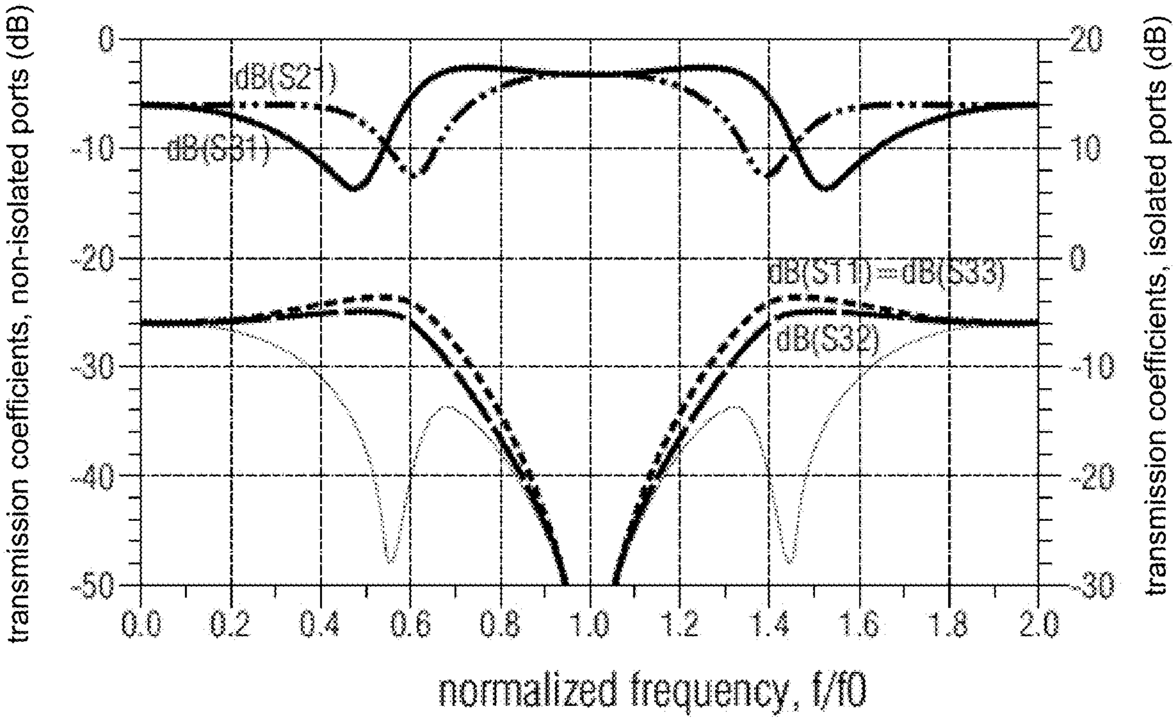
Figure 2C:
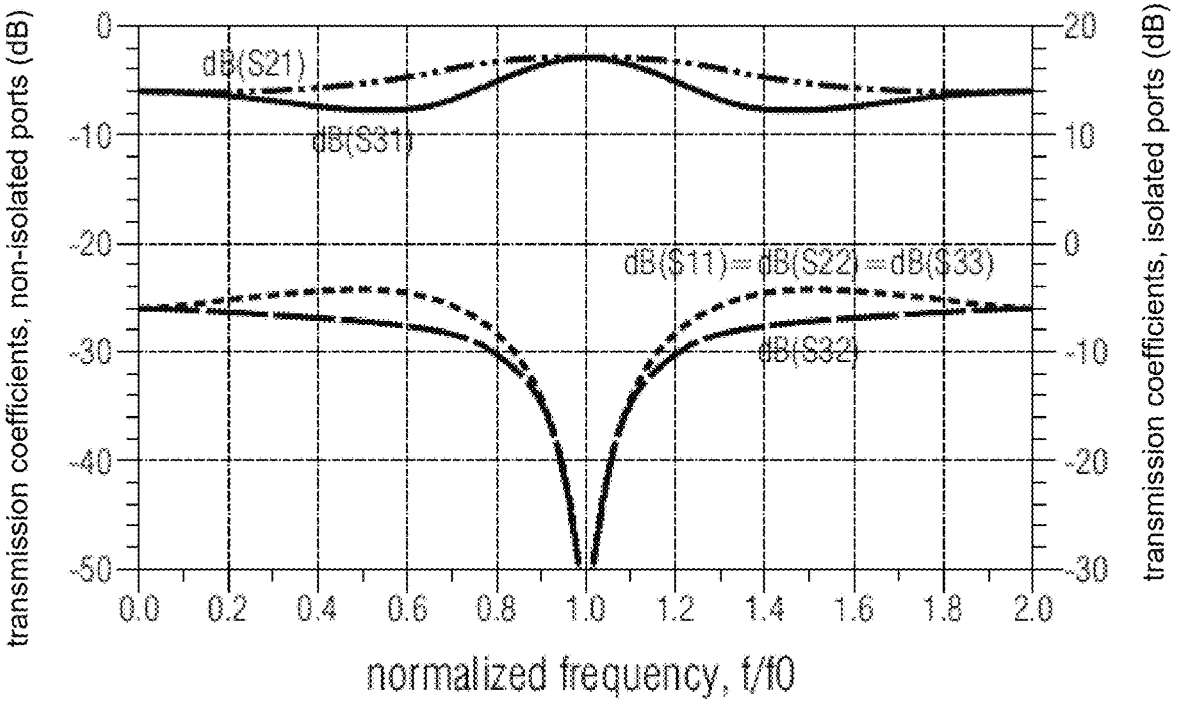
Figure 2D:
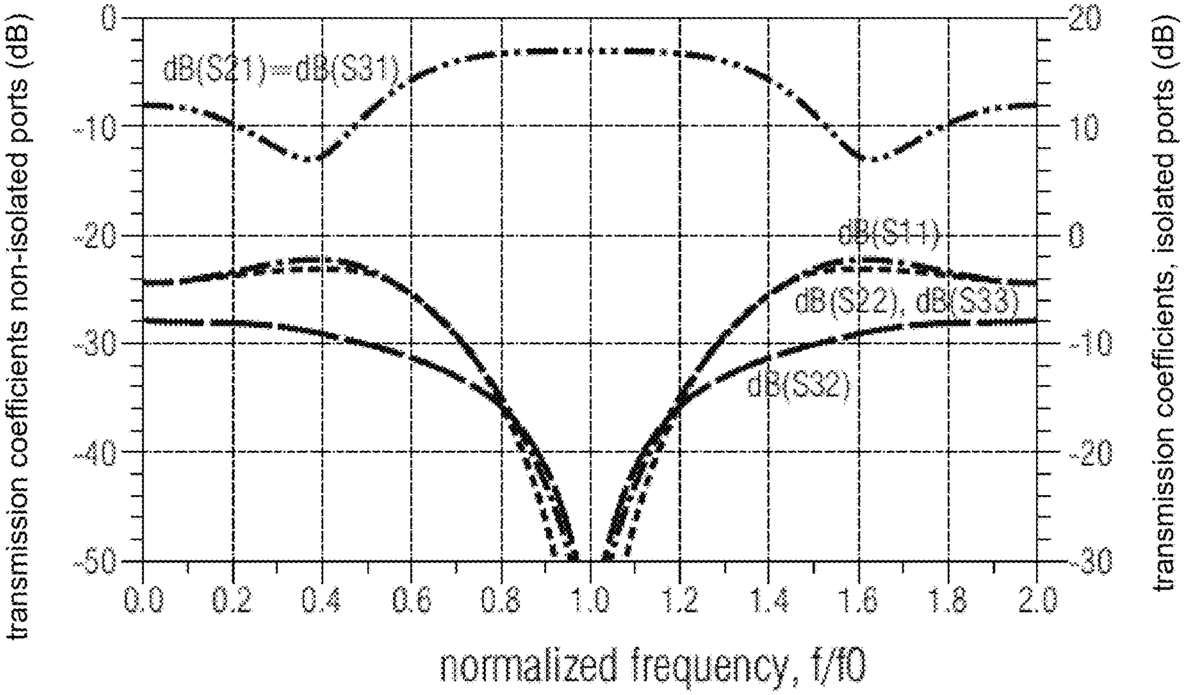
Figure 3A:
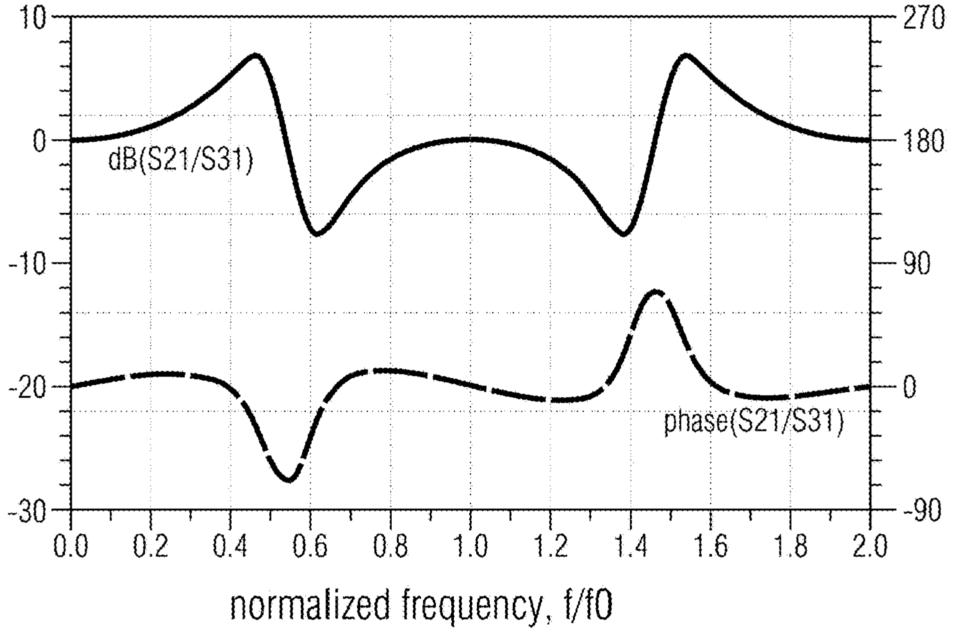
Fig. 3(A) (prior art)
FIGS. 3A and 3B show further theoretical performances of the structures as shown in FIGS. 1A-1D.
Figure 3B:
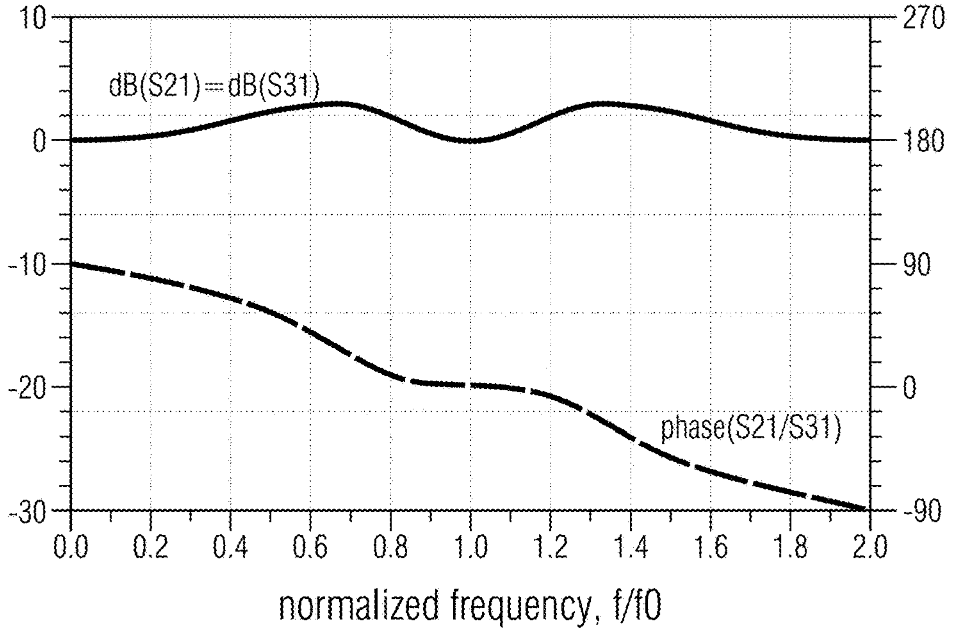
Fig. 3(B) (prior art)
Figure 5A:
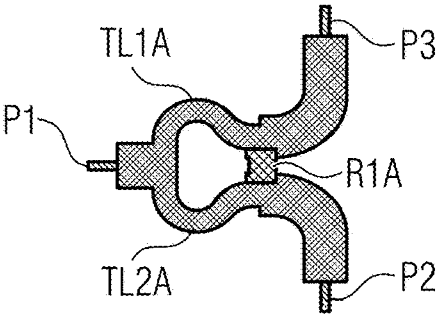
Fig. 5(A) (prior art)
FIGS. 5A, 5B, 5C, and 5D show schematic illustrations indicating examples of physical layouts of the power dividers indicated in FIGS. 1A-1D.
Figure 5B:
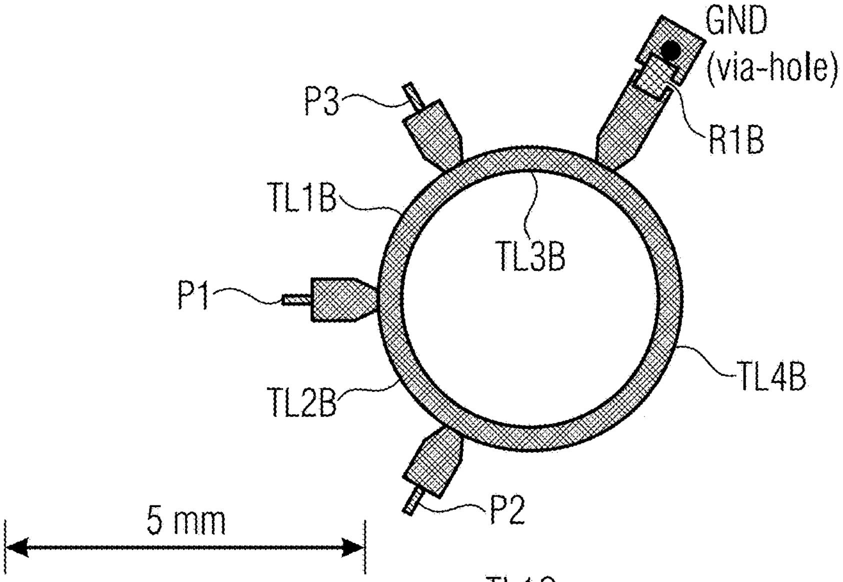
Fig. 5(B) (prior art)
Figure 5C:
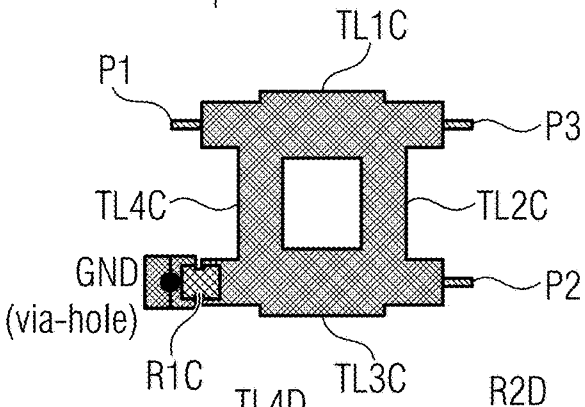
Fig. 5(C) (prior art)
Figure 5D:
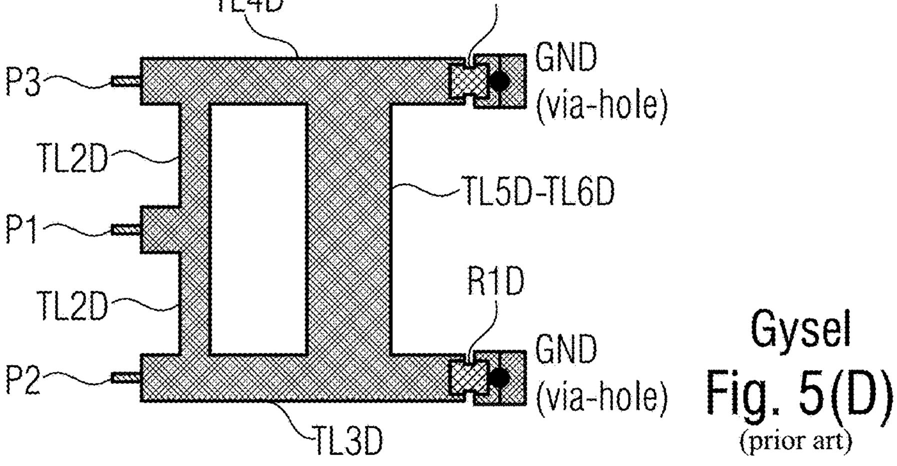
Fig. 5(D) (prior art)
Figure 6:
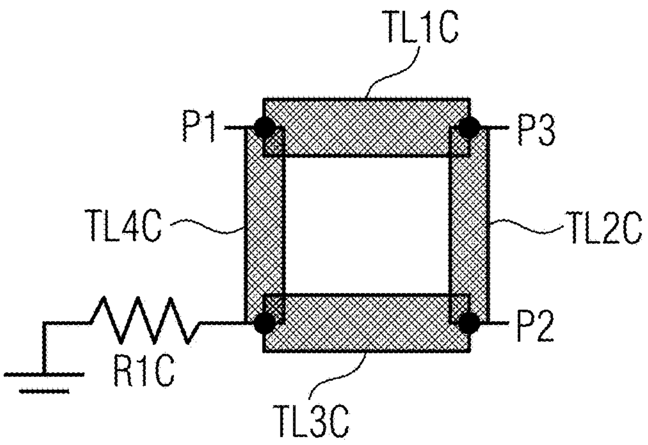
Fig. 6(A1) (prior art)
Figure 6:
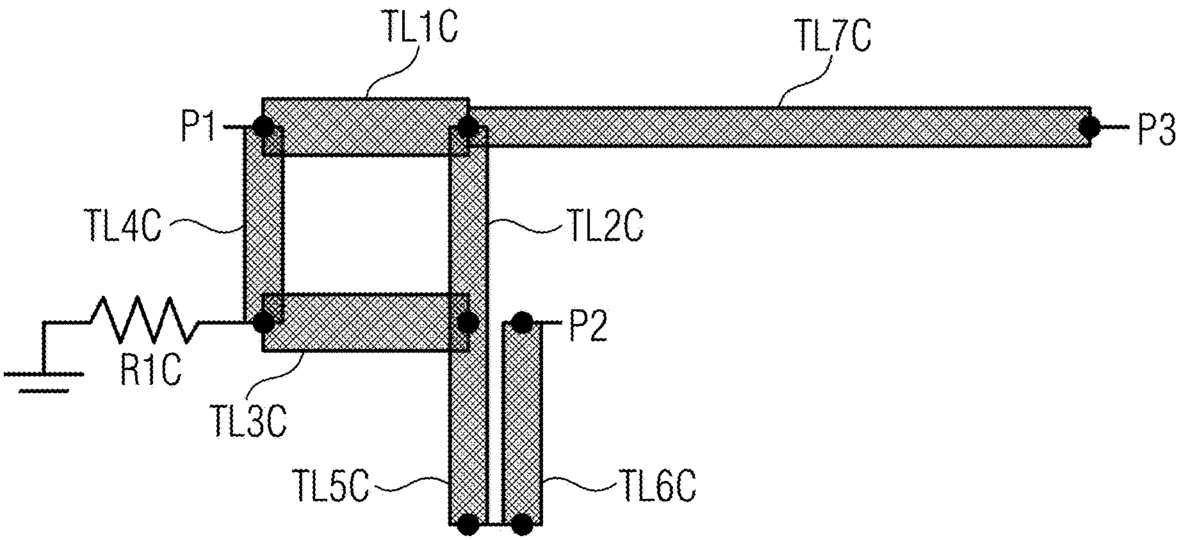
Fig. 6(A2) (prior art)
Figure 7A:
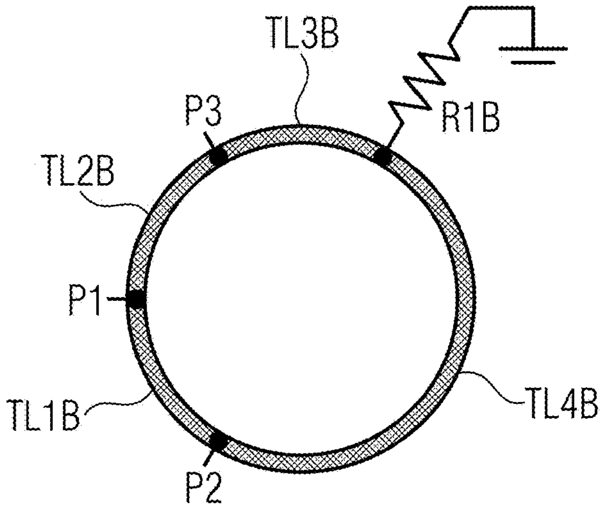
Fig. 7(A) (prior art)
FIGS. 7A and 7B show examples of Rat-race couplers according to embodiments of the present application.

FIG. 7 shows examples of a Rat-race coupler according to an embodiment of the present application. FIG. 7 (*a*) indicates a standard Rat-race coupler which is the same as indicated in FIG. 1 (B), and FIG. 7 (*b*) indicates a modified Rat-race coupler, i.e., an improved Rat-race.

As shown in FIG. 7 (*b*), the Rat race (rat race) coupler is coupled an input signal provided at an input port, P1, of the rat race coupler to a first output of the Rat race coupler, e.g. a location where a transmission line portion TL7B is connected to the rat race coupler ring, and to a second output of the Rat race coupler, e.g. a location where a transmission line portion TL8B is connected to the rat race coupler ring, a first coupling structure, comprising TL7B, coupled to the first output of the rat race coupler, to couple the first output of the rat race coupler with a first signal output port, P2; and a second coupling structure, formed by the transmission lines TL8B, TL5B, TL6B, coupled to the second output of the Rat race coupler, to couple the second output of the Rat race coupler with a second signal output port, P3; wherein a characteristic impedance, e.g. $Z_0=1/K_{GB}$*sqrt(2)*$R_0$ ($R_0$ is most typically, but not always 50), where $K_{GB}$ is the receiver gain-bandwidth constant and $R_0$ is the nominal impedance of the circuit, of a first transmission line portion, TL1B, between the input port P1 and the first output of the Rat race coupler deviates from a nominal ring impedance, e.g. sqrt(2)*$R_0$, of the Rat race coupler in a first direction, e.g. is smaller than the nominal ring impedance, and wherein a characteristic impedance, e.g. $Z_0=K_{GB}$*sqrt(2)*$R_0$, of a second transmission line portion, TL2B, between the input port P1 and the second output of the rat race coupler deviates from the nominal ring impedance, e.g. sqrt(2)*$R_0$, of the Rat-race coupler in a second direction, which is opposite to the first direction, e.g. is larger than the nominal ring impedance such that, at the design frequency of the rat race coupler, a larger signal power of the input signal is coupled to the first output port P2 than to the second signal output port P3, and such that a signal power of the input signal coupled to the first output port decreases, to become smaller than the signal power of the input signal coupled to the second output port, when the frequency of the input signal moves away from the design frequency of the rat race coupler (within an environment of the design frequency).

The characteristic impedance of a third transmission line portion, TL3B, between the second output of the Rat race coupler and a further port, e.g., terminated port P4, of the Rat race coupler, deviates from the nominal ring impedance in the same direction as the characteristic impedance of the first transmission line portion TL1B. The characteristic impedance of a fourth transmission line portion, TL4B, between the first output of the rat race coupler and a further port PA, terminated via resistor R1B to ground, of the rat race coupler deviates from the nominal ring impedance in the same direction as the characteristic impedance of the second transmission line portion TL2B.

Figure 7B:
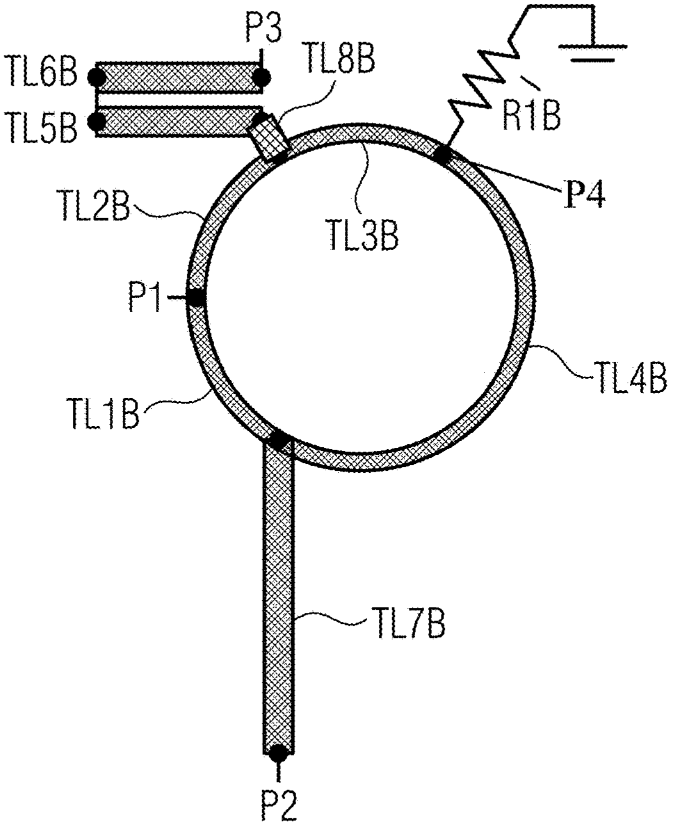
Figure 8A:
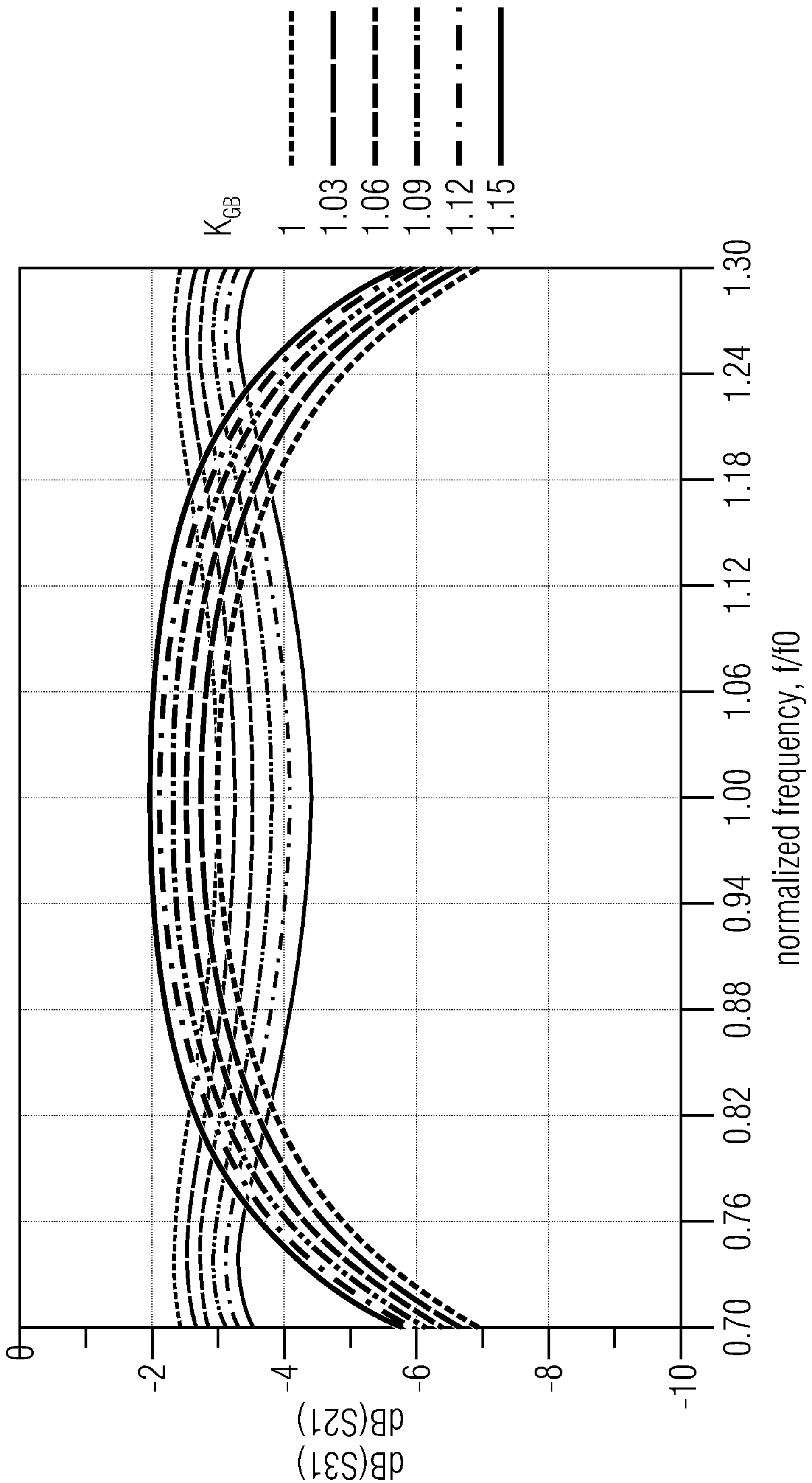
FIGS. 8A, 8B, and 8C show performance of modified Rat-race (rat race) coupler(s) according to embodiments of the present application.
Figure 8B:
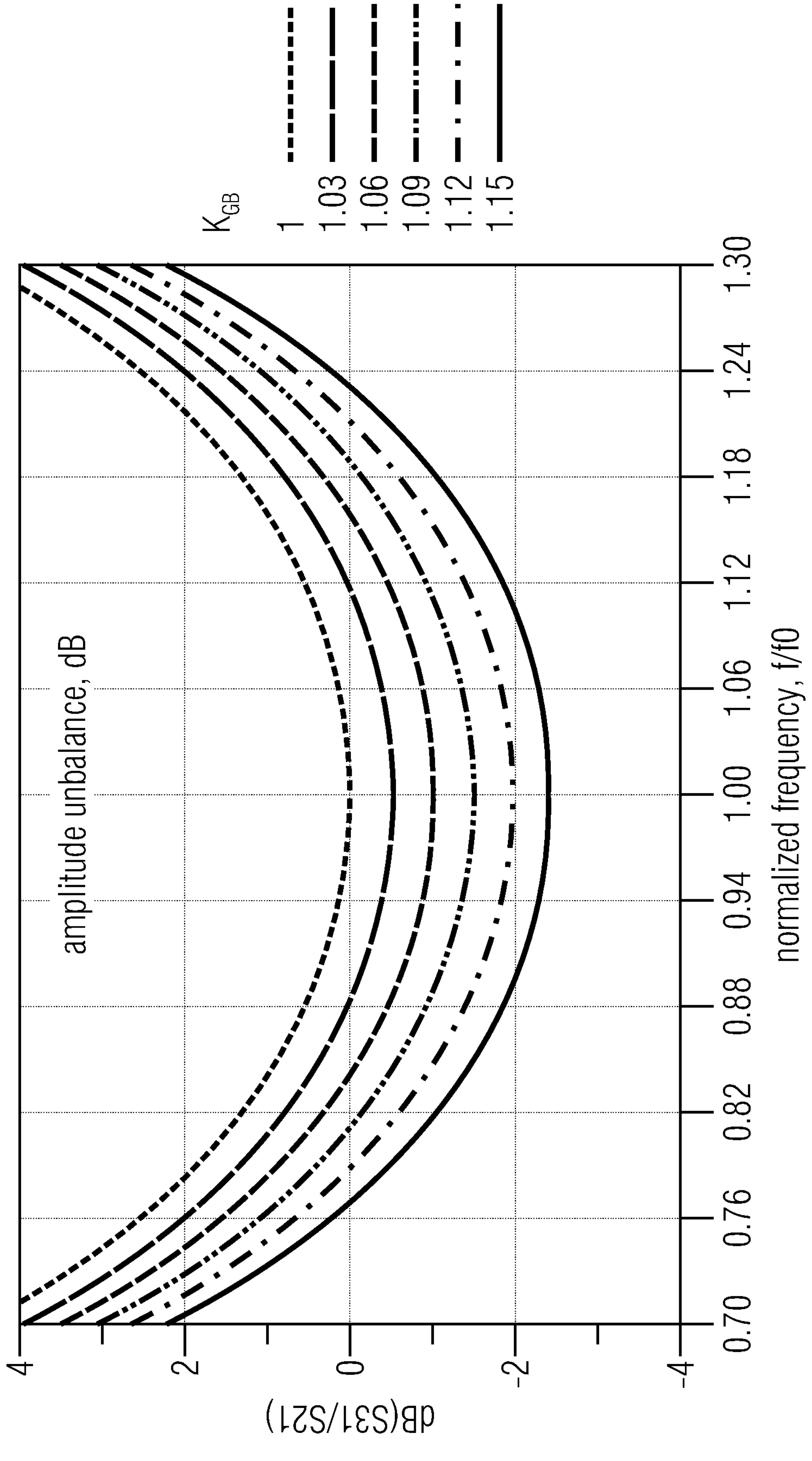
Figure 8C:
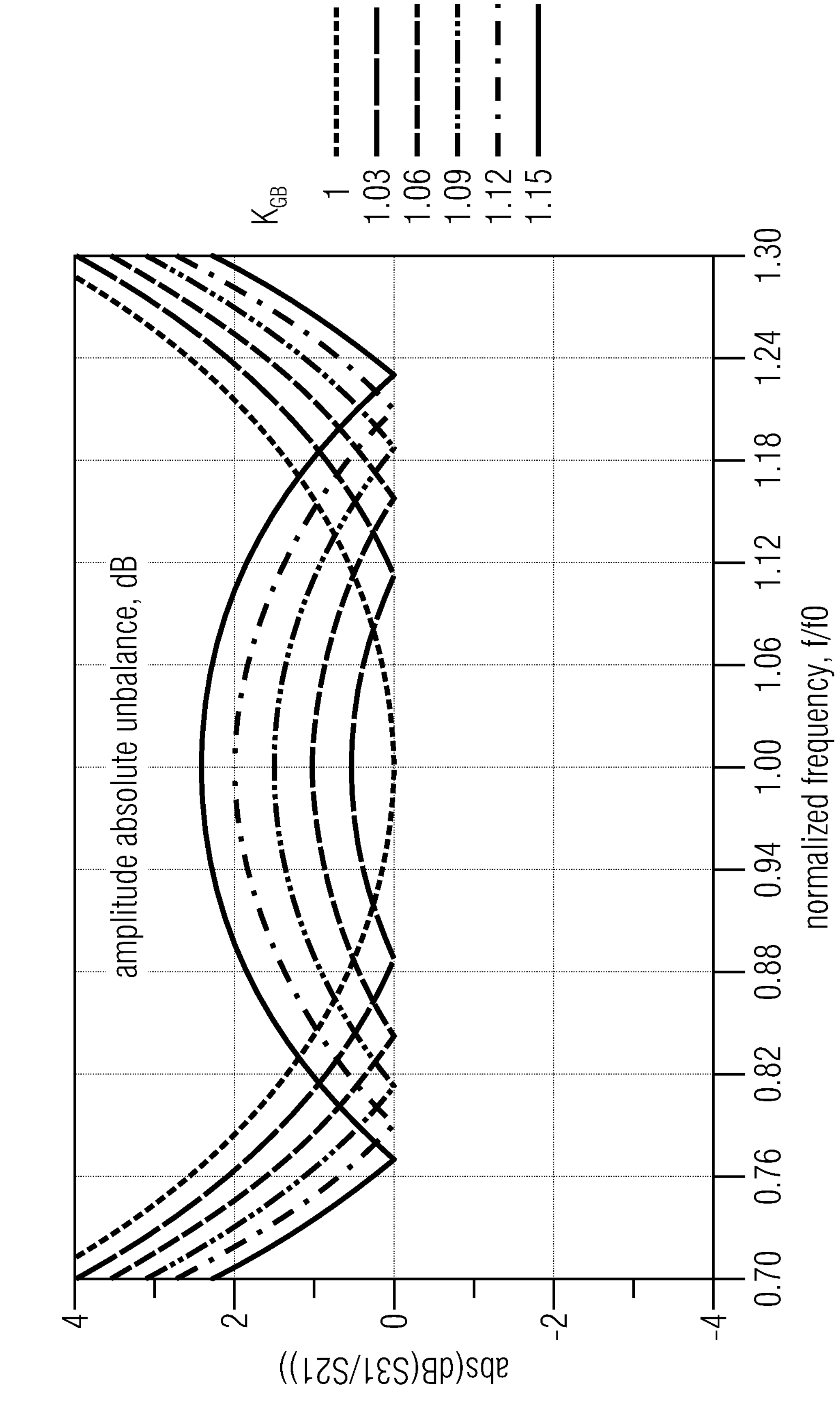

In addition, as shown in FIG. 7 (*b*), the Rat-race is inherently unsymmetrical; therefore the phase shift between the second and third ports P2, P3 is zero only at centre frequency f0. In order to flatten the phase difference, a variant of the Schiffman phase shifter can be used, as shown in FIG. 7 (*b*). The transmission portions TL6B, TL6B are λ/4 coupled lines at centre frequency f0 and with even (odd) mode impedance Z0E (Z0O) such that $Z0E*Z0O=R0^2$. The transmission line portion TL8B is a transmission with Z0=R0, which is long enough to minimize the coupling between the transmission line portions TL5B, TL6B and the Rat-race itself. The transmission line portion TL7B is a transmission with Z0=R0, and length equal to TL8B+λ/2 at the centre frequency f0. FIG. 8 shows a performance of Modified Rat race coupler for various values of $K_{GB}$, according to the embodiments of the present application. Each curve with a different line type corresponding to a value of $K_{GB}$. For example, the solid curve corresponds to a $K_{GB}$ value of 1.15. As already mentioned above, the nominal ring impedance is sqrt(2)*R0 and the characteristic impedance of the first and the third transmission line portions TL1B, TL3B is $Z0=K_{GB}$*sqrt(2)*R0 and the characteristic impedance of the second and fourth transmission line portions TL2B, TL4B is $Z0=K_{GB}$*sqrt(2)*R0. FIG. 8 (*a*) shows values of scattering parameters S21 and S31 in dB, and FIG. 8 (*b*) shows S31/S21 in dB, and FIG. 8 (*c*) shows an absolute value of S31/S21.

FIG. 9 shows a table to indicate an amplitude unbalance in dB and a relative bandwidth in dependence on the value of $K_{GB}$ according to the embodiment of the present application. In case $K_{GB}=1$ is a conventional circuit structure. As shown in FIG. 9, a reasonable value for the absolute amplitude balance could be between 1 and 2 dB. This means that the reasonable range of $K_{GB}$ is bounded between 1 (i.e. conventional design) and about 1.1 (or 1/1.1). In addition, replacing $K_{GB}$ with $1/K_{GB}$ is almost equivalent to swap the first signal output port P2 and the second signal output port P3. The result is very similar to the table shown as FIG. 9.

As a modification, a value of the characteristic impedance of the first transmission line portion TL1B differs from a value of the characteristic impedance of the third transmission line portion TL3B by no more than ±25%, or by no more than ±10% of the characteristic impedance of the first transmission line portion TL1B and the characteristic impedance of the second transmission line portion TL2B. Furthermore, a value of the characteristic impedance of the second transmission line portion TL2B differs from a value of the characteristic impedance of the fourth transmission line portion TL4B by no more than ±25%, or by no more than ±10% of the characteristic impedance of the second transmission line portion TL2B and the characteristic impedance of the first transmission line portion TL1B.

In addition, a multiplied value of the characteristic impedance of the first transmission line portion TL1B or the characteristic impedance of the third transmission line portion TL3B with the characteristic impedance of the second transmission line portion TL2B or the characteristic impedance of the fourth transmission line portion TL4B is equal to the value of square of the nominal ring impedance within a tolerance of ±10%. The value of the characteristic impedance of the first transmission line portion TL1B or the characteristic impedance of the third transmission line portion TL3B is smaller than the value of the characteristic impedance of the second transmission line portion TL2B or the characteristic impedance of the fourth transmission line portion TL4B.

Furthermore, the deviation range of the characteristic impedance from the nominal ring impedance is within ±20% or within ±10% of the value of the nominal ring impedance. That is, the value of the characteristic impedance of the first and the third transmission line portion deviates between +1% and +20%, or between +1% to +10% of the value of the nominal ring impedance, and the characteristic impedance of the second and the fourth transmission line portion deviates between −1% and −20%, or between −1% to −10% of the value of the nominal ring impedance, or vice versa.

As a further embodiment, the Rat-race is inherently unsymmetrical (see FIG. 7 (*b*)), therefore the phase shift between the first and second signal output ports P2, P3 is zero only at the centre frequency f0. In order to flatten the phase difference, a variant of the Schiffman phase shifter can be used, as shown in FIG. 7 (*b*). Coupled transmission lines TL5B, TL6B are coupled lines having an electrical length λ/4 at the centre frequency f0 and with even (odd) mode impedance Z0E (Z0O) such that $Z0E*Z0O=R0^2$.

That is, a high frequency power divider circuit for distributing an input signal to two or more signal output ports according to the embodiment is shown in FIG. 7 (*b*). The circuit comprises: a rat race coupler, wherein the rat race coupler is configured to couple an input signal provided at an input port, e.g. P1, of the rat race coupler to a first output of the rat race coupler, e.g. a location where TL7B is connected to the rat race coupler ring, and to a second output of the rat race coupler, e.g. a location where TL8B is connected to the rat race coupler ring; a first coupling structure, TL7B, coupled to the first output of the rat race coupler, to couple the first output of the rat race coupler with a first signal output port, P2; and a second coupling structure, i.e., configured by TL8B, TL5B, TL6B, coupled to the second output of the rat race coupler, to couple the second output of the rat race coupler with a second signal output port, P3; wherein the first coupling structure and the second coupling structure are adapted to provide different phase shift over frequency; wherein the first coupling structure comprises a phase shifter adapted to at least partially compensate for a frequency variation of a phase difference between signals at the first output of the rat race coupler and at the second output of the rat race coupler in an environment of a design frequency of the rat race coupler.

In addition, the second coupling structure comprises a pair of coupled transmission lines TL6B, TL5B, wherein a first end of a first coupled transmission line TL5B is connected e.g. via TL8B with the second output of the rat race coupler, wherein a second end of the first coupled transmission line is connected to a second end of a second coupled transmission line, which is adjacent to the second end of the first coupled transmission line, and wherein the first end of the second coupled transmission line TL6B is connected to second signal output port, or constitutes the second signal output port P3. The first end of the first coupled transmission line TL5B is connected, e.g. via TL8B, with the second output of the rat race coupler via a further transmission line TL8B.

Furthermore, a characteristic impedance of further transmission line deviates from a reference impedance, e.g. 50Ω, by no more than ±5% or by no more than ±10%. In addition, a product of an even mode impedance $Z_{0E}$ of the pair of coupled transmission lines and of an odd mode impedance $Z_{0O}$ of the pair of coupled transmission lines deviates from a square of the reference impedance by no more than ±5% or by no more than ±10% or by no more than ±15%.

Figures 10, 11:
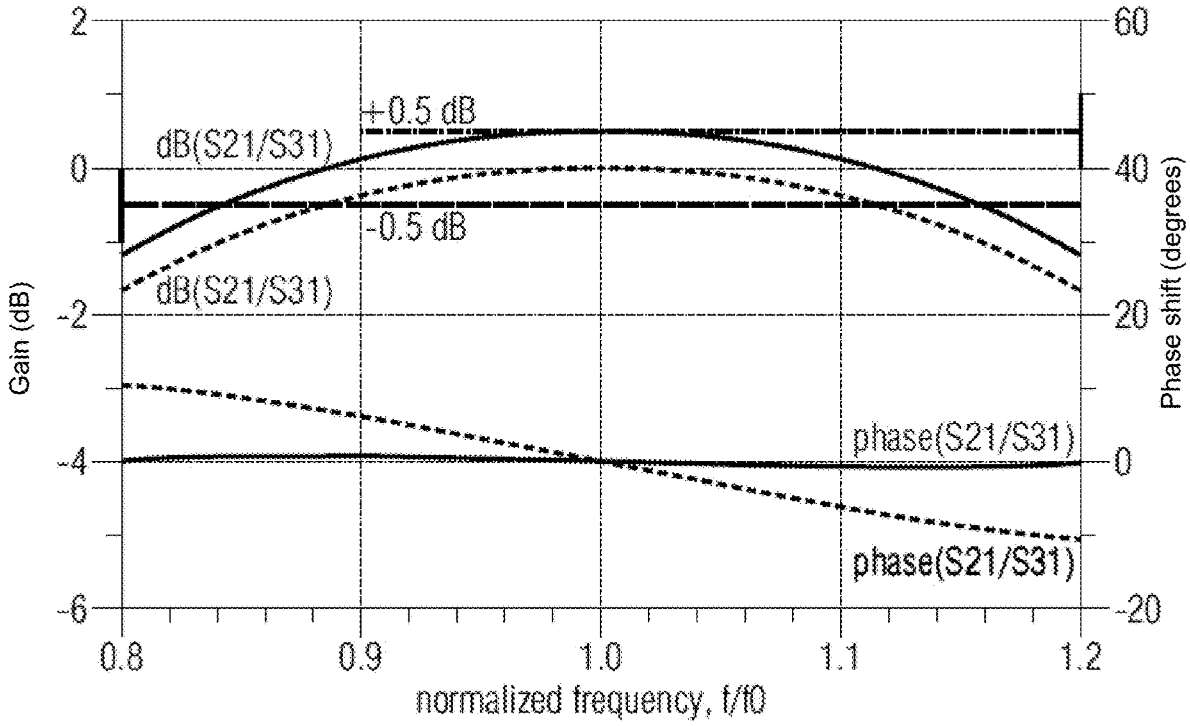
FIG. 10 shows performance of a modified Rat-race according to embodiments of the present application.
FIG. 11 shows further performance of a modified Rat-race according to embodiments of the present application.

As a modification, an electrical length of the coupled transmission lines of the pair of coupled transmission lines deviates from a fourth of a wavelength at a design centre frequency of the rat race coupler by no more than ±5%, or by no more than ±10%, in other words, the coupled transmission lines are lambda/4 transmission lines at a design centre frequency of the rat race coupler within a tolerance of ±5% or ±10%. In addition, a length of the further transmission line TL8B is chosen to decouple stray fields of the pair of coupled transmission lines from the rat race coupler. Furthermore, an electrical length of a transmission line forming the first coupling structure is equal to an electrical length of the further transmission line TL8B plus half a wavelength, with a tolerance of ± a tenth of a wavelength. FIG. 10 shows a performance over normalized frequency ($f/f_0$) of the Modified Rat-race coupler according to the embodiment of the present application. As shown in FIG. 10, the modification on Z0 of the transmission line portions TL1B, TL2B, TL3B, TL4B has almost no impact on the phase. Furthermore, the addition of the phase-compensating network, e.g., the first and the second coupling structures as illustrated in FIG. 7B, has no impact on the amplitude.

FIG. 11 also shows a performance of the modified Rat-race according to the embodiment of the present application. As shown in FIG. 11, the addition of the phase-compensating network, i.e., the addition of the first and the second coupling structure, has an impact on the phase shift. FIG. 11 illustrates exemplary value for $\Delta t/f_0$ (unmodified Rat-race), $\Delta f/f_0$ (modified Rat-race), and $\Delta\varphi$ for conventional and new solution divider networks.

The above mentioned embodiments are related to the high frequency power divider. However, the same structure is used as a high frequency power combiner circuit for obtaining an output signal on the basis of input signals from two or more signal input ports. For example, the combiner circuit comprises a rat race coupler, wherein the rat race coupler is configured to provide an output signal at an output port, e.g. P1, of the rat race coupler on the basis of a signal at a first input of the rat race coupler, e.g. a location where TL7B is connected to the rat race coupler ring, and on the basis of a signal at a second input of the rat race coupler, e.g. a location where TL8B is connected to the rat race coupler ring; a first coupling structure TL7B coupled to the first input of the rat race coupler, to couple the first input of the rat race coupler with a first signal input port P2; and a second coupling structure, e.g. configured by TL8B, TL5B, TL6B, coupled to the second input of the rat race coupler, to couple the second input of the rat race coupler with a second signal input port P3; wherein a characteristic impedance, e.g. $Z_0=1/K_{GB}*\text{sqrt}(2)*R_0$ of a first transmission line portion TL1B between the output port P1 and the first input of the rat race coupler deviates from a nominal ring impedance, e.g. $\text{sqrt}(2)*R_0$ of the rat race coupler in a first direction, e.g. is smaller than the nominal ring impedance, and wherein a characteristic impedance, e.g. $Z_0=K_{GB}*\text{sqrt}(2)*R_0$ of a second transmission line portion TL2B between the output port P1 and the second input of the rat race coupler deviates from the nominal ring impedance, e.g. $\text{sqrt}(2)*R_0$ of the rat race coupler in a second direction, which is opposite to the first direction, e.g. is larger than the nominal ring impedance.

As a further example of a high frequency power combiner circuit for obtaining an output signal on the basis of input signals from two or more signal input ports, the combiner circuit comprises: a rat race coupler, wherein the rat race coupler is configured to provide an output signal at an output port, e.g. P1, of the rat race coupler on the basis of a signal at a first input of the rat race coupler, e.g. a location where TL7B is connected to the rat race coupler ring, and on the basis of a signal at a second input of the rat race coupler, e.g. a location where TL8B is connected to the rat race coupler ring; a first coupling structure TL7B coupled to the first input of the rat race coupler, to couple the first input of the rat race coupler with a first signal input port P2; and a second coupling structure, e.g. configured by TL8B, TL5B, TL6B, coupled to the second input of the rat race coupler, to couple the second input of the rat race coupler with a second signal input port P3; wherein the first coupling structure and the second coupling structure are adapted to provide different phase shift over frequency; wherein the first coupling structure comprises a phase shifter adapted to at least partially compensate for a difference of frequency variations of transmission characteristics from the first input of the rat race coupler to the output port, and from the second input of the rat race coupler to the output port, e.g. which affect a combination of signals at the first input of the rat race coupler and at the second input of the rat race coupler, in an environment of a design frequency of the rat race coupler.

We claim:

1. A high frequency power divider circuit for distributing an input signal to two or more signal output ports, the circuit comprising:

a rat race coupler configured to couple an input signal provided at an input port thereof to a first output and to a second output thereof;

a first coupling structure coupled to the first output of the rat race coupler and configured to couple the first output of the rat race coupler with a first signal output port; and a second coupling structure coupled to the second output of the rat race coupler and configured to couple the second output of the rat race coupler with a second signal output port; and a termination port of said rat race coupler is coupled to ground, wherein a characteristic impedance of a first transmission line portion between the input port and the first output of the rat race coupler is smaller than a nominal ring impedance of the rat race coupler, and wherein further a characteristic impedance of a second transmission line portion between the input port and the second output of the rat race coupler is larger than the nominal ring impedance of the rat race coupler.

2. The high frequency power divider circuit according to claim 1, wherein a characteristic impedance of a third transmission line portion between the second output of the rat race coupler and another port of the rat race coupler is greater than the nominal ring impedance of the rat race coupler.

3. The high frequency power divider circuit according to claim 2, wherein a characteristic impedance of a fourth transmission line portion between the first output of the rat race coupler and yet another port of the rat race coupler is less than the nominal ring impedance of the rat race coupler.

4. The high frequency power divider circuit according to claim 2, wherein the characteristic impedance of the first transmission line portion differs from the characteristic impedance of the third transmission line portion by no more than ±25% of the characteristic impedance of the first transmission line portion and the characteristic impedance of the second transmission line portion.

5. The high frequency power divider circuit according to claim 3 wherein the characteristic impedance of the second transmission line portion differs from the characteristic impedance of the fourth transmission line portion by no more than ±25% of the characteristic impedance of the second transmission line portion and the characteristic impedance of the first transmission line portion.

6. The high frequency power divider circuit according to claim 3, wherein the respective characteristic impedance of the first and the third transmission line portions deviate between +1% and +20% of the nominal ring impedance, and the respective characteristic impedance of the second and the fourth transmission line portions deviate between −1% and −20% of the nominal ring impedance.

7. The high frequency power divider circuit according to claim 1 wherein the characteristic impedance of the first transmission line portion is smaller than the characteristic impedance of the second transmission line portion.

8. The high frequency power divider circuit according to claim 1 wherein a respective deviation range of the characteristic impedance of the first or the second transmission line portions from the nominal ring impedance is within ±20% of the nominal ring impedance.

9. The high frequency power divider circuit according to claim 1 wherein a product value of the characteristic impedance of the first transmission line portion multiplied by the characteristic impedance of the second transmission line portion is equal to a square of the nominal ring impedance within a tolerance of ±10%.

10. A high frequency power combiner circuit for obtaining an output signal on a basis of input signals, the circuit comprising:

- a rat race coupler configured to provide the output signal at an output port thereof on the basis of a signal at a first input thereof and on the basis of a at a second input thereof;
- a first coupling structure coupled to the first input thereof, to couple the first input thereof with a first signal input port;
- a second coupling structure coupled to the second input thereof, to couple the second input thereof with a second signal input port; and
- a termination port coupled through a resistor to ground,
- wherein a characteristic impedance of a first transmission line portion between the output port and the first input port thereof is greater than a nominal ring impedance of the rat race coupler, and wherein a characteristic impedance of a second transmission line portion between the output port and the second input port thereof is less than the nominal ring impedance thereof.

11. A high frequency power divider circuit for distributing an input signal to two or more signal output ports, the circuit comprising:

- a rat race coupler configured to couple an input signal provided at an input port thereof to a first output thereof and to a second output thereof;
- a first coupling structure coupled to the first output for coupling the first output with a first signal output port; and
- a second coupling structure coupled to the second output for coupling the second output with a second signal output port,
- wherein the first coupling structure and the second coupling structure are adapted to provide different phase shifts over frequency, and
- wherein further the first coupling structure comprises a phase shifter adapted to at least partially compensate for a frequency variation of a phase difference between signals at the first output of the rat race coupler and at the second output of the rat race coupler in a system configured to operate at a design frequency of the rat race coupler,
- wherein the second coupling structure comprises a pair of coupled transmission lines,
- wherein a first end of a first coupled transmission line of the pair of coupled transmission lines is coupled with the second output of the rat race coupler, wherein a second end of the first coupled transmission line of the pair of coupled transmission lines is coupled to a second end of a second coupled transmission line, which is adjacent to the second end of the first coupled transmission line of the pair of coupled transmission lines, and
- wherein the first end of the second coupled transmission line of the pair of coupled transmission lines is coupled to the second signal output port.

12. The high frequency power divider circuit according to claim 11, wherein said first end of the second coupled transmission line is coupled with the second output of the rat race coupler via a further transmission line.

13. The high frequency power divider circuit according to claim 12, wherein a characteristic impedance of the further transmission line deviates from a reference impedance by no more than ±5%.

14. The high frequency power divider circuit according to claim 12, wherein a length of the further transmission line is selected to decouple stray fields of the pair of coupled transmission lines from the rat race coupler.

15. The high frequency power divider circuit according to claim 12, wherein an electrical length of a transmission line forming the first coupling structure is equal to an electrical length of the further transmission line plus half a wavelength, with a tolerance of ±a tenth of a wavelength.

16. The high frequency power divider circuit according to claim 11, wherein a product of an even mode impedance of the first and second coupling structures and of an odd mode impedance of the first and second coupling structures deviates from a square of a nominal impedance of the high frequency power divider circuit by no more than ±5%.

17. The high frequency power divider circuit according to claim 11, wherein an electrical length of the pair of coupled transmission lines deviates from a fourth of a wavelength at a design centre frequency of the rat race coupler by no more than ±5%.

18. A high frequency power combiner circuit for obtaining an output signal on a basis of input signals, the circuit comprising:

a rat race coupler, wherein the rat race coupler is configured to provide the output signal at an output port of the rat race coupler on the basis of the input signals at a first input thereof and at a second input thereof;

a first coupling structure coupled to the first input of the rat race coupler, for coupling the first input of the rat race coupler with a first signal input port;

wherein said first coupling structure is coupled to the rat race coupler at only one junction; and a second coupling structure coupled to the second input of the rat race coupler, for coupling the second input of the rat race coupler with a second signal input port, wherein the first coupling structure and the second coupling structure are adapted to provide different phase shifts over frequency, and wherein the first coupling structure comprises a phase shifter adapted to at least partially compensate for a difference of frequency variations of transmission characteristics from the first input port of the rat race coupler to the output port, and from the second input port of the rat race coupler to the output port in a system configured to operated at a design frequency of the rat race coupler.

19. The high frequency power combiner circuit of claim 18, wherein the second coupling structure comprises a first coupled transmission line having a first end coupled with the second output of the rat race coupler, wherein a second end of the first coupled transmission line is coupled to a second end of a second coupled transmission line, which is adjacent to the second end of the first coupled transmission line, and wherein a respective characteristic impedance of said first and second transmission lines varies by no more that ±25%.

* * * * *